United States Patent [19]
Meddock et al.

[11] Patent Number: 5,552,065
[45] Date of Patent: Sep. 3, 1996

[54] OIL FILTRATION METHOD AND ELEMENT OF WOUND COTTON/PAPER COMPOSITION

[75] Inventors: Mark T. Meddock, Carlsbad; Leroy J. Meddock, Santa Ana, both of Calif.; Charles W. Johnson, Amarillo, Tex.

[73] Assignee: The OilGuard Company LLC, Rancho Santa Fe, Calif.

[21] Appl. No.: 371,090

[22] Filed: Jan. 10, 1995

[51] Int. Cl.$^6$ .................... B01D 39/18; B01D 27/06
[52] U.S. Cl. .............. 210/808; 210/494.1; 210/497.1; 210/500.1
[58] Field of Search ................. 210/168, 171, 210/437, 440, 457, 494.1, 494.2, 494.3, 497.01, 497.1, 499, 500.1, 500.29, 767, DIG. 17, 808; 139/383 B, 387 R, 420 B; 55/528, DIG. 5; 242/7.01, 7.02, 7.21, 7.22

[56] References Cited

U.S. PATENT DOCUMENTS

| | | | |
|---|---|---|---|
| 3,088,594 | 5/1963 | Yelinek | 210/494.1 |
| 3,648,846 | 3/1972 | Sicard | 210/494.1 |
| 4,187,136 | 2/1980 | Nostrand | 210/494.1 |
| 4,225,442 | 9/1980 | Tremblay et al. | 210/497.1 |
| 4,655,939 | 4/1987 | Moser | 210/500.1 |
| 4,660,779 | 4/1987 | Nemesi et al. | 242/7.02 |
| 4,751,901 | 6/1988 | Moor | 123/196 A |
| 4,801,383 | 1/1989 | Hoffman et al. | 210/494.1 |
| 4,915,837 | 4/1991 | Verity | 210/500.29 |

*Primary Examiner*—Joseph W. Drodge
*Attorney, Agent, or Firm*—James Creighton Wray

[57] ABSTRACT

A method of filtering internal combustion and industrial engine oil includes providing a specially wound filter element in a canister and passing the liquid through it slowly (e.g., 1–2 quarts per minute). The filter element includes a length of cotton/cellulose paper composition yard wound on a core in an irregular winding pattern such that some layers filter smaller (e.g., 1 micron) particles and others further from the core filter larger (e.g., 5 micron) particles. A filter element constructed according to the invention includes a core having a hollow interior, a perforated outer surface in fluid communication with the hollow interior, an open first end in fluid communication with the hollow interior, and a closed second end. A length of yarn of cotton and cellulose paper composition is wound in a series of layers over the outer surface of the core in the irregular winding pattern such that some layers closer the core filter particles down to a smaller size than do other layers further from the core. A layer of filter material is provided between the winding and the outer surface of the core to trap any paper and cotton particles breaking free from the yarn.

13 Claims, 2 Drawing Sheets

OIL FILTRATION METHOD AND ELEMENT OF WOUND COTTON/PAPER COMPOSITION

BACKGROUND OF THE INVENTION

1. Technical Field

This invention relates generally to filtration, and more particularly to a method and filter element for filtering contaminants from internal combustion and industrial engine oil.

2. Description of Related Art

Recall that a typical full flow filter system in an on-highway truck application allows a flow rate in the range of about twenty to forty gallons per minute. Passing oil at that flow rate through a pleated paper, stacked disc, or other conventional filter element filters particulate matter down to about 40 microns in size from the engine oil. But it often fails to effectively trap smaller particles and remove moisture, and so the oil must be changed more frequently than desired.

Truck owners often use an auxiliary bypass filter for additional filtering. A typical bypass filter retrofits to the truck engine where it diverts oil through a finer auxiliary filter element at a much slower rate (e.g., 2.5 gallons per minute or less). Passing the oil through the auxiliary filter element helps filter out particles smaller than 40 microns. That improves engine oil life and the life of the engine.

But existing bypass filters have certain problems that need to be overcome. For example, many existing bypass filter elements are surface filters in the sense that filtering occurs at just the outer surface of the element where the oil first enters the element. With very fine surface filter elements, particles tend to accumulate at the outer surface, thereby loading the filter element and cutting off the flow of liquid through it. As a result, filtering is degraded and the element must be changed more frequently than desired. So, owners need a way to filter engine oil that alleviates the foregoing surface buildup problem.

In addition, many existing bypass filter elements result in "channeling" in the sense that the oil passes through the filter element along one or more channels or paths of less resistance. The filter element may initially have such paths of less resistance (a problem in rolled media filters made with cotton/synthetic fibers composition) or develop them over time (a problem of filters packed with cotton/synthetic fibers, sawdust, hulls, and other such media). Oil passing under pressure through the filter element seeks out the channels, and a breach in the surface of the filter element may even allow the oil to flow through the filter without any filtering at all. Thus, owners need a way to filter engine oil that also alleviates the foregoing channeling problem.

SUMMARY OF THE INVENTION

This invention solves the problems outlined above by passing the oil to be filtered at a slow flow rate of about 1–2 quarts per minute through a specially wound, cylindrically-shaped filter element. The filter element has an elongated hollow core on which a length of yarn is wound in a multi-layered winding. The yarn is a composition of cotton and cellulose paper so that it absorbs water without the usual step of heating the oil. In addition, it is wound with an irregular winding pattern such that layers near the core are adapted to filter particles down to a size of (i.e., no smaller than) one micron and layers further out from the core are adapted to filter particles down to (i.e., no smaller than) a size of 5 microns. A preferred embodiment includes layers near the outer circumference of the filter element that are adapted to filter particles down to a size of 25 microns.

The petroleum-based or synthetic oil to be filtered passes radially through the multi-layered winding of the filter element, from the outer circumference of the filter element into the hollow core, and then axially through the hollow core back out of the canister. Different layers of the filter element trap different size particles, ranging from about 25–40 microns at the outer circumference to about 3–10 microns near the core. Meanwhile the cotton-and-cellulose-paper composition of the yarn absorbs water. That way, this invention filters the oil more effectively.

To paraphrase some of the claim language subsequently presented, a method of filtering internal combustion and industrial engine oil includes the step of providing a filter element in a canister having an inlet and an outlet. The filter element has an elongated hollow core with a perforated outer surface and a length of yarn of cotton and cellulose paper composition that is wound in a series of layers over the outer surface of the core in an irregular winding pattern. At least one inward one of the layers disposed near the core has a first winding pattern adapted to filter particles down to a first size. At least one intermediate one of the layers disposed radially further out from the core than the inward one of the layers has a different second winding pattern adapted to filter particles down to a second size that is larger than the first size.

The method proceeds by introducing the oil into the inlet of the canister under pressure at a flow rate in the range of from about one to about two quarts per minute. That is done so that the oil passes radially from an outer circumference of the filter element, through the layers of the filter element, and into the hollow core. The method of this invention thereby traps different size particulate matter at different layers of the filter element while absorbing water from the oil. The oil is then discharged from the hollow core back out of the outlet of the canister.

In line with the above, a filter element constructed according to the invention includes a core having a hollow interior, a perforated outer surface in fluid communication with the hollow interior, an open first end in fluid communication with the hollow interior, and a closed second end. The filter element includes a length of cotton/cellulose composition yarn wound in a series of layers over the outer surface of the core in an irregular winding pattern such as that described above. In addition, means are provided in the form of a layer of filter material disposed between the winding and the outer surface of the core for trapping any paper and cotton particles breaking free from the yarn.

According to still another aspect of the invention, the yarn may be spun using known textile equipment from carded cotton and conventional cellulose paper (e.g., toilet tissue), enabling a single filter element to absorb up to 100 cc of water. The following illustrative drawings and detailed description make the foregoing and other objects, features, and advantages of the invention more apparent.

DESCRIPTION OF THE PREFERRED EMBODIMENTS

Figure 1:
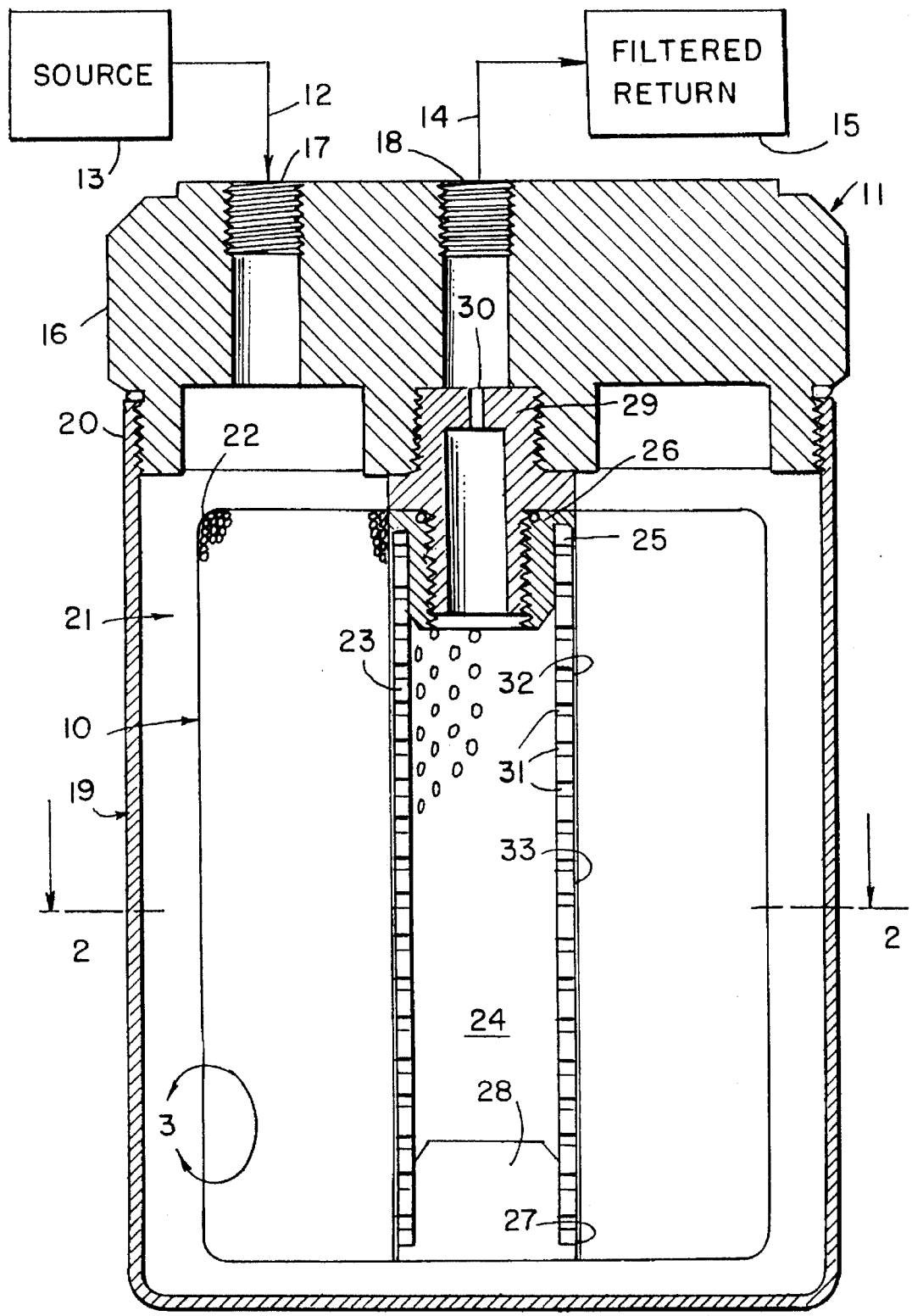
FIG. 1 of the drawings is a cross sectional view showing a filter element constructed according to the invention within a spin-on canister for practicing the method of the invention.

FIG. 1 of the drawings shows a filter element 10 constructed according to the invention. It is mounted in a canister assembly 11 (FIG. 1) that is connected, as shown diagrammatically in FIG. 1, via a first line 12 (e.g., a first ½" O.D. hose) to a pressurized source 13 of oil (e.g., an auxiliary oil port on the block of an engine on a truck) and via a second line 14 (e.g., a second ½" O.D. hose) to a return 15 (e.g., valve cover, oil filler pipe, or oil pan on the engine). Interconnected that way, the filter element 10 is used according to the method of the invention to filter oil (e.g., provide additional filtering of the truck engine oil).

The canister assembly 11 may be similar in some respects to known filter element containers used in other cartridge-based filter installations. It includes a cap 16 of steel or other suitable composition that mounts by suitable means on an available support structure. The cap 16 may mount under the hood of a truck next to the engine, for example. It includes an inlet 17 to which the line 12 connects by a known type of fitting or other suitable means (the details of which are not shown) and an outlet 18 to which the line 14 connects by another fitting or other suitable means (not shown).

The canister assembly 11 also includes an upwardly opening canister 19, of steel or other suitable composition, with a threaded upper lip 20 that screws onto the cap 16 and a hollow interior 21 in which the filter element 10 fits. The user first mounts the filter element 10 on the cap 16. Then he screws the canister 19 onto the cap 16 to complete the installation.

Although the size and shape of components may vary according to the precise installation, the illustrated filter element 10 is a cylindrically shaped component having a four-inch outside diameter and an eight-inch axial length along a filter axis 10A. It includes a length of yarn 22 wound in a multi-layered winding on an elongated, cylindrically shaped, core 23 composed of steel or other suitably rigid material. The core 23 has a hollow interior 24, a first end 25 into which a first plug 26 is mounted in a force fit, and a second end 27 into which a second plug 28 is mounted in a force fit.

The first plug 26 screws onto an adaptor component 29 that screws into the cap 16. The first plug 26 and adaptor component 29 thereby connect the first end 26 and hollow interior 24 of the core 23 in fluid communication with the outlet 18 of the cap 16 through an orifice 30 in the adaptor component 29 that restricts the flow rate to a desired range. Meanwhile, the second plug 28 closes the second end 27 of the core 23, and a series of openings 31 in the core 23 form what may be called a perforated outer surface 32 of the core 23 in fluid communication with the hollow interior 24 or the core 23. Only a few of the openings 31 are designated in FIG. 1 for illustrative convenience.

Oil from the source 13 passes through the line 12 into the inlet 17 in the cap 16 at about one to two quarts per minute. From there, it passes into the interior 21 of the canister 19. Next, it passes radially through the several layers subsequently described of the multi-layered winding formed by the length of yarn 22 and thereafter through a filter paper 33 covering the perforated surface 32 of the core 23. The filter paper 33 forms a cylindrically shaped sleeve over the core 23, between the yarn 22 and the perforated surface 32, and it takes the form of conventional polyester-based filter paper capable of passing particles smaller than 40 microns while trapping any cotton and paper particles breaking free from the yarn.

After passing through the filter paper 33, the oil passes through the openings 31, into the interior 24 of the core 23. Next, it passes axially through the core 23 toward the first plug 26. Then it passes through the first plug 26, the adaptor component 29, the outlet 18 in the cap 16, and the line 14 to the return 15. As the oil follows that path, particles in the oil are trapped in the many layers of yarn wound on the core 23.

According to a major aspect of the invention, the yard is composed of a composition of cotton and cellulose paper and it is wound with an irregular winding pattern such that some layers near the core 23 trap smaller particles while layers further from the core 23 trap larger particles. Using a known type of spinning machine such as may be used in the textile trade, for example, strands of carded cotton and toilet tissue are spun into a 0.1875 inch diameter length of yarn composed of about 5–25% cellulose paper (preferably about 5–10%). Then, using a known type of precision winding machine such as may be used in the textile trade for winding bobbins, for example, the length of yarn is wound in an irregular winding pattern onto the core 23.

The core 23 is mounted on the winding machine and rotated by the machine at a controlled rate while the yarn is fed through a head to core 23 so that it winds onto the core. Meanwhile, the head is moved back and forth parallel to the longitudinal axis of the core 23. By varying the speed of rotation and the speed of the head, various winding patterns are produced by the winding machine in a manner known by those of ordinary skill in the winding art. That is done in winding the yarn 22 on the core 23 to form the filter element 10 so that the winding pattern is different for various ones of the series of layers of the filter element 10.

Figure 2:
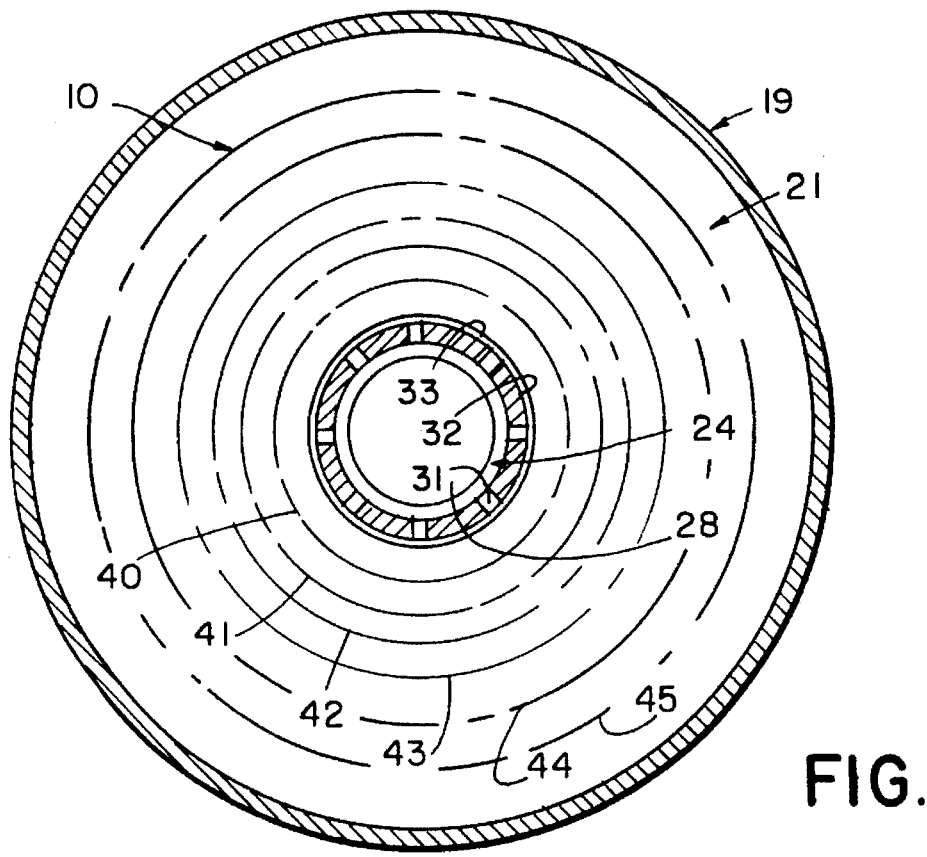
FIG. 2 is a cross sectional view of the filter element taken on line 2—2 of FIG. 1.

FIG. 2 uses phantom lines to depict six layers 40 through 45 of the filter element 10. Of those layers, the layer 40 is radially nearest the core 23 while each one of the layers 41–45 is progressively further out from the core 23 than the preceding layer. The layer 45 is the furthest from the core 23 and it is at and defines the outer circumference of the filter element 10.

The yarn is wound in an irregular winding pattern such that at least one inward one of the layers disposed near the core (e.g., layer 40) has a first winding pattern (a first size weave) adapted to filter particles down to (i.e., no smaller than) a first size (e.g., one micron). In addition, at least one intermediate one of the layers disposed radially further out from the core than the inward one of the layers (e.g., layer 41 ) has a different second winding pattern (a second size weave) adapted to filter particles down to (i.e., no smaller than) a second size that is larger than the first size (e.g., 5 microns). Wound that way, all the particles filtered from the oil do not collect at or near the outer circumference. They collect at different radial distances from the core 23.

Preferably, the yarn is wound to produce one or more additional layers adapted to filter still different sizes. In the illustrated filter element 10, for example, the layer 42 is adapted to filter particles down to 10 microns in size (a 10 micron weave). In addition, the layer 43 is adapted to filter particles down to 20 microns in size (a 20 micron weave), the layer 44 is adapted to filter particles down to 30 microns in size (a 30 micron weave), and the layer 45 is adapted to filter particles down to 40 microns in size (a 40 micron weave). From the foregoing description, one of ordinary skill in the art can vary the number, frequency, position, and size of the various weaves to achieve the function described without departing from the inventive concepts disclosed.

Figure 3:
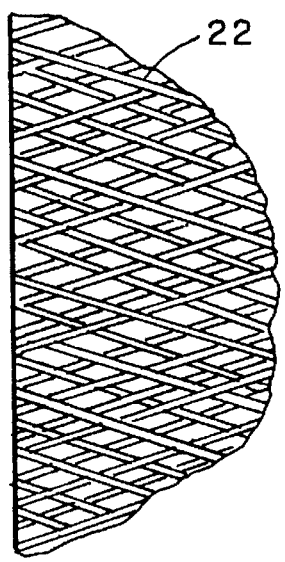
FIG. 3 is an enlarged section of the winding pattern within the circular line 3 in FIG. 1.

FIG. 3 depicts what is referred to in the winding art as a "diamond pattern" or "diamond weave." The winding pattern forms what looks like a series of diamonds, and the rate at which the winding machine rotates the core 23 during winding of the filter element 10 combines with the rate at which the winding head moves back and forth longitudinally to set the diamond size. A one micron weave (i.e., a weave adapted to filter particles down to, but not smaller than, one micron in size), has 39 diamonds around the circumference. A 3 micron weave (i.e., a weave adapted to filter particles down to but not smaller than 3 microns in size) has 27 diamonds around the circumference. A 5 micron weave (i.e., a weave adapted to filter particles down to but not smaller than 5 microns) has 23 diamonds around the circumference. Still larger weaves have even fewer diamonds around the circumference, and those particulars are within the knowledge and capabilities of one of ordinary skill in the art.

Thus, the invention passes oil to be filtered at a slow flow rate of about 1–2 quarts per minute through a filter element wound with cotton/cellulose paper in an irregular winding pattern or weave. It absorbs water without heating. It alleviates buildup. It reduces channelling. It filters more effectively. Although an exemplary embodiment has been shown and described, one of ordinary skill in the art may make many changes, modifications, and substitutions without necessarily departing from the spirit and scope of the invention.

What is claimed is:

1. A method of filtering oil, comprising:

providing a filter element in a canister having an inlet and an outlet, the filter element having an elongated hollow core with a perforated outer surface and a length of yarn of cotton and cellulose paper composition that is wound in a series of layers over the outer surface of the core in an irregular winding pattern such that at least one inward one of the layers disposed near the core has a first winding pattern adapted to filter particles down to a first size and at least one intermediate one of the layers disposed radially further out from the core than the at least one inward one of the layers has a different second winding pattern adapted to filter particles down to a second size that is larger than the first size;

introducing the oil into the inlet of the canister under pressure at a flow rate in the range of from about one to about two quarts per minute so that the oil passes radially from an outer circumference of the filter element and through the series of layers of the filter element into the hollow core, to thereby trap different size particulate matter at different layers of the filter element while absorbing water from the oil; and discharging the oil from the hollow core out of the outlet of the canister.

2. A method as recited in claim 1, wherein the first size is one micron.

3. A method as recited in claim 1, wherein the second size is five microns.

4. A method as recited in claim 1, wherein the irregular winding pattern is such that at least one outer one of the layers disposed radially further out from the core than the at least one intermediate one of the layers has a different third winding pattern adapted to filter particles down to a third size that is larger than the second size.

5. A method as recited in claim 1, wherein the cellulose paper composition of the yarn is in the range of about 5% to about 25% of total yarn composition.

6. A filter element, comprising:

a core having a hollow interior, a perforated outer surface in fluid communication with the hollow interior, an open first end in fluid communication with the hollow interior, and a closed second end;

a length of yarn of cotton and cellulose paper composition that is wound in a series of layers over the perforated outer surface of the core in an irregular winding pattern such that the series of layers are adapted to filter different size particles; and means in the form of a layer of filter material disposed between the series of layers and the perforated outer surface of the core for trapping any paper and cotton particles breaking free from the yarn;

the series of layers of the filter element including at least one inward layer disposed near the core, said at least one inward layer having a first winding pattern adapted to filter particles down to a first size; and the series of layers of the filter element including at least one intermediate layer disposed radially further out from the core than the at least one inward layer, said at least one intermediate layer having a different second winding pattern adapted to filter particles down to a second size that is larger than the first size.

7. A filter element as recited in claim 6, wherein the first size is about one micron.

8. A filter element as recited in claim 6, wherein the second size is about five microns.

9. A filter element as recited in claim 6, wherein the series of layers of the filter element includes at least one outer layer disposed radially further out from the core than the at least one intermediate layer, said at least one outer layer having a different third winding pattern adapted to filter particles down to a third size that is larger than the second size.

10. A filter element as recited in claim 6, wherein the cellulose paper composition of the yarn is in the range of about 5% to about 25%.

11. A method of fabricating a filter element for filtering oil, comprising:

providing a core with a hollow interior and a perforated outer surface in fluid communication with the hollow interior; and winding a length of yarn comprised of cotton and cellulose paper in a series of layers over the outer surface of the core in an irregular winding pattern such that at least one inward layer near the core has a first winding pattern adapted to filter particles down to a first size and at least one intermediate layer radially further out from the core than the at least one inward layer has a different second winding pattern adapted to filter particles down to a second size that is larger than the first size.

12. A method as recited in claim 11 wherein the step of winding a length of yarn includes spinning the length of yarn from cotton and cellulose paper.

13. A method as recited in claim 12, wherein the step of spinning includes spinning the length of yarn from cotton and toilet tissue.

\* \* \* \* \*